Merriman & Ross.

Channeling Stone.

No. 4,264. Reissued Feb. 14, 1871

Witnesses,

M. B. Livingston
Wm. Freeman

Inventors,

C. G. Merriman
J. S. Ross
Per Munn & Co.
Attorneys

N. PETERS, PHOTO-LITHOGRAPHER, WASHINGTON, D. C.

UNITED STATES PATENT OFFICE.

THOMAS ROSS AND ROCKWOOD BARRETT, OF RUTLAND COUNTY, VERMONT, ASSIGNEES, BY MESNE ASSIGNMENTS, OF ANDREWS T. MERRIMAN AND THOMAS ROSS.

IMPROVEMENT IN MACHINE FOR CHANNELING STONE.

Specification forming part of Letters Patent No. 59,856, dated November 20, 1866; Reissue No. 4,264, dated February 14, 1871.

*To all whom it may concern:*

Be it known that we, THOS. ROSS and R. BARRETT, in the county of Rutland and State of Vermont, assignees of A. T. MERRIMAN, THOS. ROSS, J. B. REYNOLDS, and R. BARRETT, patentees of an Improved Machine for Channeling Stone; and we hereby declare the following to be a full, clear, and exact description of the same, reference being had to the accompanying drawings, forming a part of this specification, in which—

Figure 1:
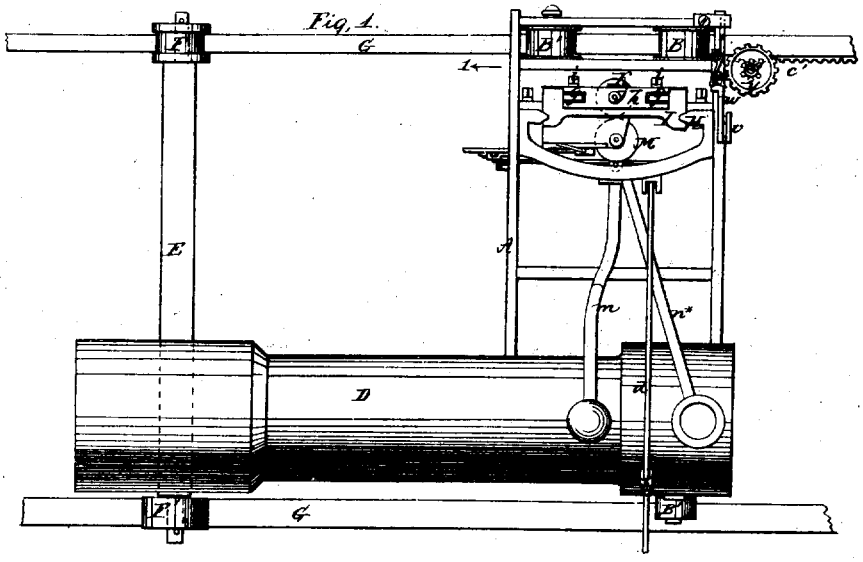
Figure 2:
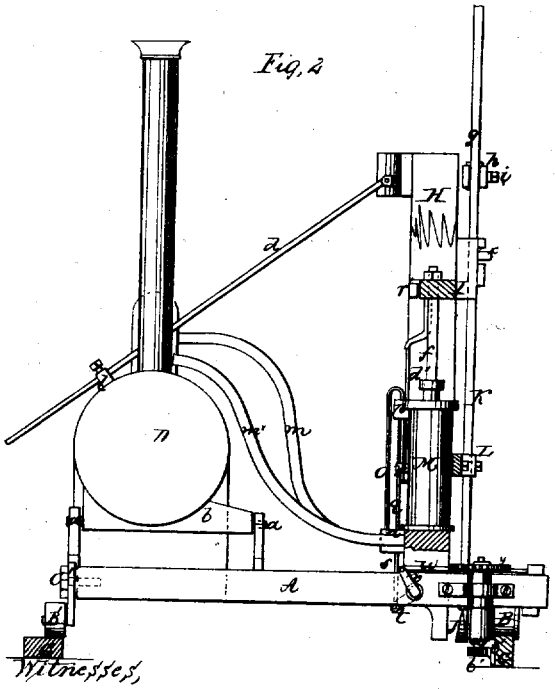
Figure 3:
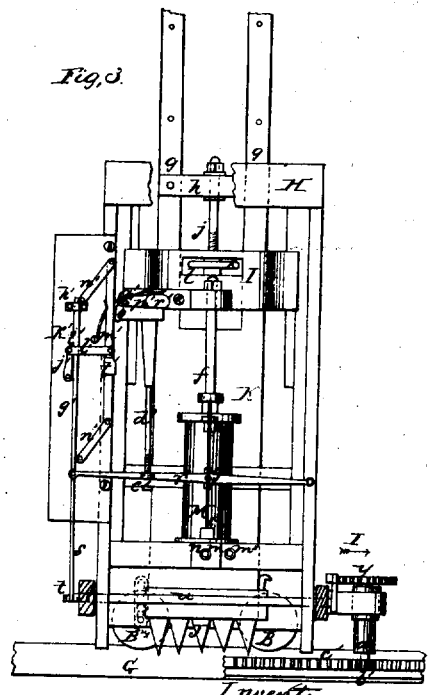

Figure 1 represents a plan or top view of the invention. Fig. 2 is a sectional end elevation of the same. Fig. 3 is a front elevation of the same.

This invention relates to improvements in stone-channeling machines in which a gang of reciprocating cutters operated by a steam cylinder and piston provided with automatic valve gear are all mounted on a movable truck-frame, which is moved forward by automatic feed mechanism to keep the cutters up to the work as it progresses; and said improvements consist—

First, in combining, in a stone-channeling machine, the following instrumentalities, all mounted on a movable truck-frame, viz: first, a steam generator and engine; second, a gang of reciprocating cutters all fastened together and operated by the engine; third, an automatic adjustable valve-gear so constructed and operated that the steam-valve is changed and the motion of the cutters thereby reversed by the concussion of the cutters with the rock; fourth, an automatic feeding mechanism to feed the machine up to the work as the latter progresses.

Second, in so hinging the cutter-frame to the truck-frame and so attaching the cutter-frame and cylinder together that the cutter-frame, with the cylinder, may be inclined laterally to either side or retained in a vertical position, so as to cut a channel either diagonal to the horizon or vertical, as may be desired.

A represents a truck-frame, made of iron or other suitable material, and supported by three wheels, B B* B′, two of which are secured to axles which have their bearings in one side of the truck-frame, whereas the axle of the last wheel, B′, is fastened in a slotted bracket, C, that is adjustable on the opposite side of the truck-frame. This adjustable bracket C serves the purposes of leveling the truck-frame, and renders it unnecessary to put down the two rails forming the track on the same plane whenever (as is often the case) it is inconvenient to do so. The axle of the wheel B* is arranged on a bracket similar to the bracket C, and by adjusting this up or down the truck-frame and standards which carry the cutting apparatus are inclined forward or backward for the purpose, as stated above, of causing the rear cutters of the gang to cut the deepest, each chisel or cutter cutting a little deeper than the one preceding it, whereas if all cut the same depth the forward cutters would have to do the greater part or nearly all the cutting. The end of the boiler D is supported on two standards on the truck-frame A, which form the bearings for trunnions *a a* on the axle or rock-shaft *b*, to which the boiler is secured. These trunnions permit the truck-frame A to adjust itself to the track on which it moves when the wheel B* is in any desired position. The opposite end of the boiler D rests on an axle, E, upon which are two wheels, F F′. The length of this axle is equal to the length of the truck-frame, or, in other words, the distance of the wheel F from the wheel F′ is equal to that of the wheels B B* from the wheel B′, so that they will run on the track G. It would be quite as well to have the boiler firmly secured to the truck-frame A, and entirely dispense with the axle E and the wheels F F′, and also have the wheel B* without the adjustable bracket, but so attach the cutter-frame H to the truck-frame A that it can be inclined forward and backward, as well as laterally.

The track G is composed of two rails, one of which may be simply a flat strip of iron, whereas the other is so shaped that it fits in between the flanges of the wheels B B* F; or the track and wheels may be constructed in any suitable manner. Said track is bolted down upon the surface of the rock to be channeled. From the truck-frame rises the cutter-frame H, forming the guides to the cutter-bar, to which also is attached the steam-cylinder or motive power. This cutter-frame is attached to the truck-frame by a hinge-joint on pivot *h* in such a manner that it can be maintained in a vertical position or can be inclined laterally. The rod *d*, which is hinged to the upper end of the cutter-frame, passing through an eye-bolt, *c*, secured to the boiler, serves to adjust and retain said cutter-frame in the desired position. This arrangement of attaching and combining the motive power with the cutter-frame in such a manner that it can be inclined laterally with it is a very essential feature, inasmuch as by this means the cutters can be made to cut a channel either vertical or at any desired inclination, in either of which positions the motive power and working parts of the machine always maintain the same relation to each other and to the channel, thus avoiding a very complex mechanism, which otherwise would be necessary.

The cutter-frame H, to which also is attached the motive power, forms the guide for the cross-head I, which is secured to the piston-rod *f*, and which transmits the motion of said piston-rod to the gang of cutters J. These cutters are secured in a socket formed on the lower end of the cutter-bar K by means of a key, by which means they can readily be removed when desired for sharpening, and also quickly and firmly secured. The said cutter-bar K slides up and down with the cross-head I, being guided at its lower end by the slotted bar L, which is secured to the cutter-frame H, and on which the said bar L may be moved downward as the cutters penetrate the rock, so as to give the bar K support as near the cutters J as practicable. The upper portion of the bar K forms two shanks, *g*, which pass through the cross-head I, and which are connected to each other by a cross-piece, *h*, fastened to them by means of screws *i*, above the cross-head, and arranged so that it can be adjusted higher or lower on said shanks, according to the depth to which the cutters are expected to descend. In the cross-piece *h* is secured the feed-screw *j*, which passes down freely through a suitable hole in the cross-head and screws in the hub of a hand-wheel, *k*, situated in a transverse slot, *l*, in the cross-head, as clearly shown in Fig. 3. By turning the hand-wheel *k* the cutters can be raised or lowered nearly the whole length of the feed-screw *j*, and if this length is not sufficient to reach the desired depth the cross-piece *h* is moved higher up on the shanks *g* after a certain depth has been reached, and the operation is continued until the channel in the rock or stone has reached the required depth.

The piston-rod *f* emanates from the steam-cylinder M, to which steam is admitted from the boiler D through a flexible pipe, *m*. This pipe *m* may be wholly of flexible material, or the greater part of it, as well as the exhaust-pipe, may be of such material as is ordinarily used for similar purposes, with flexible joints, so that it will not interfere with the desired movements of the cutter-frame H. The cylinder is secured to the cutter-frame, and swings back and forth with it in the manner and for the purposes before described. The steam-pipe passes into a suitable valve-chest, *n*, at or near the bottom of the cylinder, and an additional steam-pipe, *o*, extends to the small steam-cylinder P, at or near the top of the cylinder. Within the small cylinder P is a valve-piston, to which the valve-rod *q* is attached, and when steam is admitted into the valve-chest *n* it at the same time passes by the pipe *o* to the cylinder P, and, acting on the valve-piston, would force the rod *q* and steam-valve in the valve-chest *n* down, thus opening the steam-port and admitting steam under the piston of the cylinder M, were it not prevented from so doing by the automatic valve-gear, which we will proceed to describe. Attached to the valve-rod *q* is a lever, *r*, which has its fulcrum at one end on one of the uprights of the cutter-frame H, and its opposite end is connected to a bar, *g'*. This bar passes up through a suitable box or clasp, *h'*, and it is provided with a projection or nose, *i'*, which forms a bearing for a stop-pawl, *j'*. Said stop-pawl is hinged to a plate, *k'*, attached to one of the uprights of the cutter-frame, and it connects by a link, *l'*, with a parallel bar, *m'*, which is connected to the plate *k'* by links *n'*. This bar *m'* has a tendency by its own gravity, owing to the inclination of the links *n'*, to move inward toward the middle of the cutter-frame, (which tendency may be increased by a spring, if necessary,) drawing with it, by the link *l'*, the stop-pawl *j'*, and holding it under the nose *i'* of the bar *g'*. This prevents the opening of the steam-valve in the steam-chest *n*, and will do so until the stop-pawl *j'* lets go the nose *i'* of the bar *g'*.

Attached to the cross-head I and moving up and down with it is an elbow-lever, *o' p'*, which has its fulcrum at *q'*. The short arm *o'* of this lever slides against the inner edge of the parallel bar *m'*, and the long arm *p'* is loaded with a weight, *r'*, and supported by a spring. On the fulcrum-pin *q'* of said elbow-lever is mounted a small roller, *s'*, and at a suitable point on the bar *m'* is an inclined projection, *t'*, which comes in contact with the roller *s'* in case the cutters descend too far. A rod, *d'*, is attached at its upper end to the cross-head I, its lower end passing loosely through an eye in the lever *r*, on which rod is a screw-thread and nut, *e'*. This nut may be screwed up and down on the rod *d'*, and serves to shorten or lengthen the stroke of the piston. When the cutters rise by the action of the steam on the under side of the piston, the nut, *e'* comes in contact with the lever *r* and raises the steam-valve in the valve-chest *n'*, thus closing the induction and opening the exhaust port. The stop-pawl *j* is drawn under the nose *i'* by the bar *m'*, thus holding the valve in this position, while the piston, cross-head, and cutter-bar descend by their own gravity. As soon as the cutters strike the rock the momentum of the weight *r'* on the elbow-lever *o' p'* causes the short arm *o'* of said lever to press back the parallel bar $m'$ and stop-pawl $j'$, releasing the bar $g'$ and lever $r$, and permitting the piston in the small cylinder P to force down the steam-valve in the valve-chest $n$, thus readmitting steam to the under side of the piston in the cylinder M and repeating the operation. In case the cutters do not strike the rock before the piston has descended so far as to endanger its striking the lower cylinder-head, the roller $s'$ will come in contact with the inclined projection $t'$ and force back the bar $m'$ and pawl $j'$, and thus readmit the steam under the piston and prevent its descending too far. The height to which the piston and cutter-bar is permitted to rise is regulated by the nut $e'$ at the lower end of the rod $d'$. If the nut is screwed up, the stroke is shortened, and if the nut is screwed down the stroke is lengthened. By means of this arrangement the force of the blow given by the cutters can be regulated at pleasure. We do not confine ourselves to this particular construction of all the parts of this valve-gear, but would employ means, substantially as above described, by which the valve-gear is made automatic, and the valve is changed by the concussion of the cutters with the rock by means of a momentum piece or weight, as shown at $r'$, Fig. 3.

A feed movement is imparted to the whole apparatus by the rod $s$, which receives motion from the end of the lever $r$, and connects with an arm, $t$, which is fastened to the end of the rock-shaft $u$. Said rock-shaft has its bearings in the truck-frame A, and an arm, $v$, mounted on its opposite end, connects with a slide, $w$, to which a reversible pawl, $x$, is attached, which serves to impart motion to the feed-wheel $y$. This feed-wheel is mounted on an upright shaft, $a'$, which has its bearings in suitable boxes secured to the truck-frame, and to the lower end of which a pinion, $b'$, is firmly secured. This pinion engages or works into the rack $c'$, which is attached to one of the rails which constitute the track G.

The reversible pawl $x$ may be changed, so as to feed either forward or backward over the rock to be channeled. When it is desired to feed the machine in the direction of the arrow 1, Fig. 3, the wheel B* is raised up on the truck-frame A. This causes the cutter-frame H, cutter-bar K, cylinder M, and all their appurtenances to incline to the left; consequently the left-hand or rear cutters of the gang of cutters J will cut into the rock a little deeper than the forward cutters. Were they not so arranged the forward cutters would have to perform nearly all the cutting, whereas by this arrangement the work is equally distributed over all the cutters. The degree of inclination given to them should be regulated by the amount of feed imparted to the truck-frame at each stroke and by the hardness of the rock to be cut. The cutters J have their cutting-edges at unequal distances from each other. This variation need only be slight to effect the desired object—namely, to cause them to cut the bottom of the channel smooth and even—and it is preferable to have the variation irregular.

By the construction of a stone-channeling machine substantially as herein described the machine and power are made to occupy the least possible space, (which often is of the greatest importance,) and with it a channel can be cut of any desired depth, either vertical or at any desired inclination, and the whole mechanism is simple, strong, compact, and easily adjusted.

What we claim as the invention of the said A. T. MERRIMAN and THOMAS ROSS is—

1. In a stone-channeling machine adapted to move automatically over the face of the rock operated upon, so as to feed the cutting device up to the work, the combination of the following instrumentalities, all mounted on a movable truck-frame, viz: a gang of reciprocating cutters all fastened together, a steam-generator, cylinder and piston to operate said cutters, an automatic adjustable valve-gear so constructed and operating that the steam-valve is changed and the motion of the cutters thereby reversed by the concussion of the cutters with the rock, and an automatic feeding mechanism to feed the machine up to the work as the latter progresses, all constructed and combined to operate substantially as herein set forth.

2. In combination with the instrumentalities described in the foregoing claim in a stone-channeling machine as therein set forth, the cutter-frame with the steam-cylinder rigidly attached thereto, and so hinged to the truck-frame that the cutter-frame may be inclined to either side or retained in a vertical position to cut a channel diagonal to the horizon or vertical, substantially as described.

THOS. ROSS.
ROCKWOOD BARRETT.

Witnesses:
W. C. DUNTON,
W. H. DUNTON.